Oct. 9, 1951     W. H. BURKS, JR     2,570,316

CAPTIVE AIRCRAFT CONTROL

Filed Oct. 11, 1949     2 Sheets-Sheet 1

INVENTOR.
WILLIAM H. BURKS, JR.
BY
McMorrow, Berman + Davidson
ATTORNEYS.

Oct. 9, 1951 W. H. BURKS, JR 2,570,316
CAPTIVE AIRCRAFT CONTROL
Filed Oct. 11, 1949 2 Sheets-Sheet 2

INVENTOR.
WILLIAM H. BURKS, JR.
BY
McMorrow, Berman + Davidson
ATTORNEYS.

Patented Oct. 9, 1951

2,570,316

UNITED STATES PATENT OFFICE 2,570,316

CAPTIVE AIRCRAFT CONTROL

William H. Burks, Jr., Lynwood, Calif.

Application October 11, 1949, Serial No. 120,681

2 Claims. (Cl. 46—77)

This invention relates to an improved control system for the flight-control surfaces of aircraft, particularly of captive aircraft, wherein the aircraft are maintained captive and have their flight-control surfaces operated in flight by means of wires, the primary object of the invention being to provide a control system of this character which automatically provides for the proper amount of operation of the control surfaces of the aircraft for different flight conditions and which precludes such operation thereof as produces over-control and under-control.

Another important object of the invention is to provide a system of the character indicated above which automatically alters a pre-setting of the control surfaces determining the over-all path of flight of the aircraft, whenever there occurs a change in predetermined mean flying speed, as at the launching or landing of the aircraft, or a deviation of the aircraft from the predetermined path, whereby the control wires are kept taut at all times, so that loss of control of the aircraft under such conditions is prevented.

A further important object of the invention is to provide a system of the character indicated above which automatically coordinates the changes in setting of the various control surfaces, so that the control surfaces are moved out of pre-set positions in directions and in amounts suited to the flight speed and to correction of a deviation in flight of the aircraft, whereby over-control of any of the control surfaces is positively precluded Other important objects and advantageous features of the invention will be apparent from the following description and the accompanying drawings, wherein, merely for purposes of illustration herein, a specific embodiment of the invention is set forth in detail.

Figure 1:
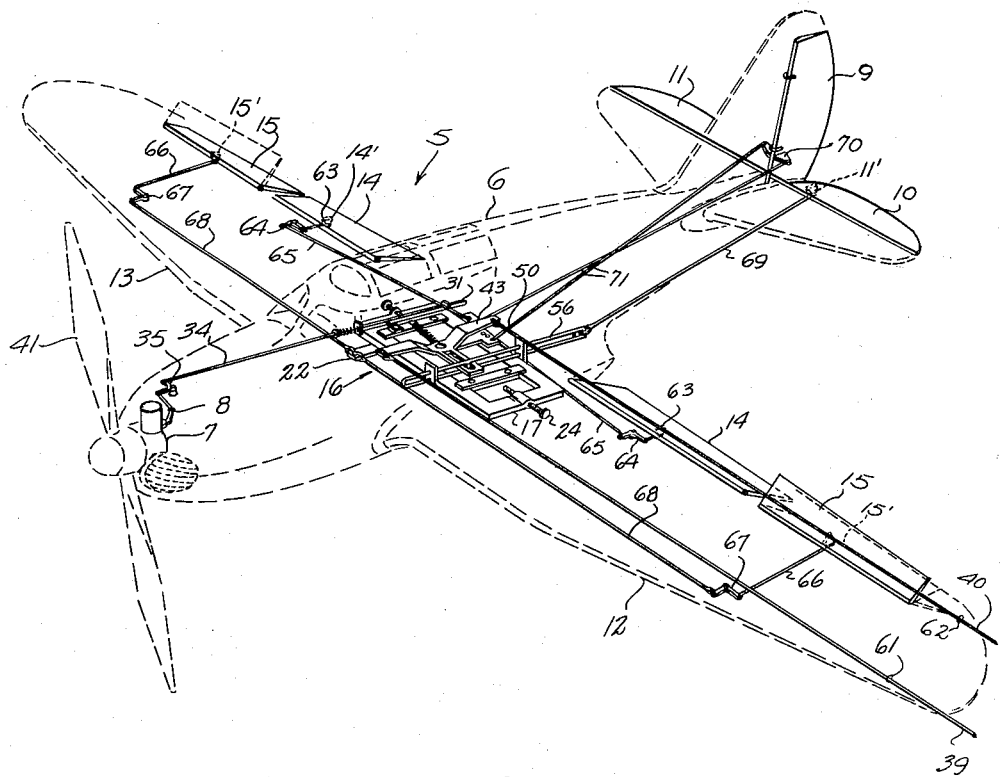
Figure 1 is a front perspective view of a model or miniature captive airplane equipped in accordance with the present invention.
Figure 4:
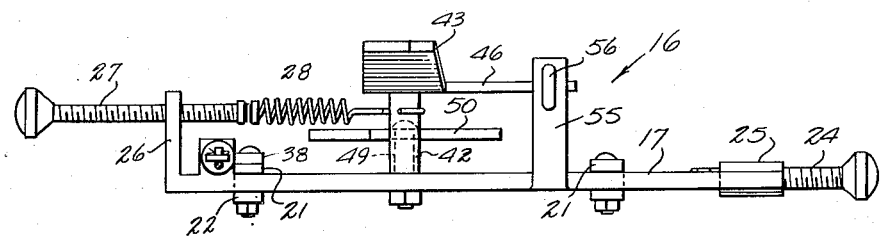
Figure 4 is a side elevation thereof.

Referring in detail to the drawings, wherein like numerals designate like parts throughout the several views, the numeral 5 generally designates a miniature or model airplane, although the invention is applicable also to full-size aircraft, the illustrated airplane having a fuselage 6 enclosing in its forward end an engine 7 having a timer arm 8, and terminating at its rear end in a rudder 9 and an elevator having left and right portions 10 and 11, respectively, and having a control horn 11' on its underside. From the fuselage 6 project left and right wings 12 and 13, respectively, on each of whose trailing edges are hingedly mounted in the usual manner a flap 14 and an aileron 15, having control horns 14' and 15', respectively, on their under sides.

A control unit 16 is mounted in the fuselage 6 in line with the wings 12 and 13 and is operatively connected to the engine timer arm 8, the rudder 9, the elevator portions 10 and 11, and the wing flaps 14 and ailerons 15 for automatic coordinated control thereof.

The control unit 16 comprises a base plate 17, here shown as rectangular and arranged lengthwise across the airplane 5, holes 18 being provided in the plate corners for bolts or the like, whereby the unit is rigidly secured in position on the airplane. The base plate 17 is formed with a longitudinally-elongated opening 19 in which the rectangular plate-like slide 20 is positioned for endwise movement. Secured to the top of the slide 20 at the ends thereof are guide bars 21, 21 which project beyond the sides of the slide and bear upon the upper surface of the base plate 17. Secured to the under side of the slide 20 at the outboard end thereof is another guide bar 22 which engages the under side of the base plate 17 and has ends extending beyond the sides of the base plate 17 and provided with holes 23.

An adjustable stop screw 24 is journaled at 25 in the inboard end of the base plate 17 to be engaged by and to limit inboard movement of the slide 20. The outboard end of the base plate 17 has a vertical lug 26 thereon in which is threaded a spring-adjusting screw 27 positioned on a level above the slide 20, and having secured to its inward end a contractile helical spring 28.

Adjacent to the outboard end of the base plate 17, lugs 29, 29 rise from opposite sides thereof and have bearing openings 30 through which slides the engine-control slide bar 31. An expanding helical spring 32 is circumposed on the forward end of the slide bar 31 and is confined between the adjacent lug 29 and a collar 33 fixed on the bar. A wire 34 connected to the forward end of the slide bar 31 is connected to one arm of a bell crank 35 mounted behind the engine timer arm 8. The slide bar 31 has a hole 36 therein adapted to be engaged by a pin 37 projecting from a riser 38 on the adjacent end of the slide 20, whereby in the extreme outboard or retracted position of the slide 20, the slide bar 31 is positively held in a retracted starting or retarded position. The arrangement is such that in adjusting the airplane 5 for flight, the slide 20 is sufficiently advanced in an inboard direction to take the pin 37 out of the slide bar hole 36. The engine 7 is then started and the timer arm 8 and engine carburetion adjusted to produce the R. P. M. desired for flight. The timer arm 8 is then retarded to idling position so that the pin 37 is reengaged with the hole 36 in the slide bar 31 and the timer is held in idling position, in which the engine 7 idles and the airplane 5 remains in stationary position on the ground or other flight platform. The operator then takes his position at the remote end of the control wires 39, 40 and by giving these wires a brisk pull the slide 20 is moved in an inboard direction against the resistance of the spring 28 and the pin 37 is disengaged from the slide bar hole 36 and the spring 32 advances the slide bar 31 and hence the timer arm 8 to flying speed position, so that the engine 7 drives the propeller 41 at the predetermined flight speed and produces a take-off of the airplane 5. The operator uses the wires 39 and 40 to control the airplane 5 for take-off, flight, and for landing. This eliminates the need for a second person to hold the airplane while the operator takes his control position, and to release the airplane upon a signal from the operator, as is the usual procedure.

A spacer 42 rising from a forward central part of the slide 20 has mounted on its upper end a T-shaped master bell crank 43 by means of a bolt 44 passing through the middle of the cross-head 45 of this bell crank. The arm 46 extends in an inboard direction from the middle of the cross-head 45 and is formed with a longitudinal slot 47. Along one side of the slot 47 is a series of holes 48. The inboard end of the retarding and tensioning spring 28 is connected to the spacer 42.

Figure 2:
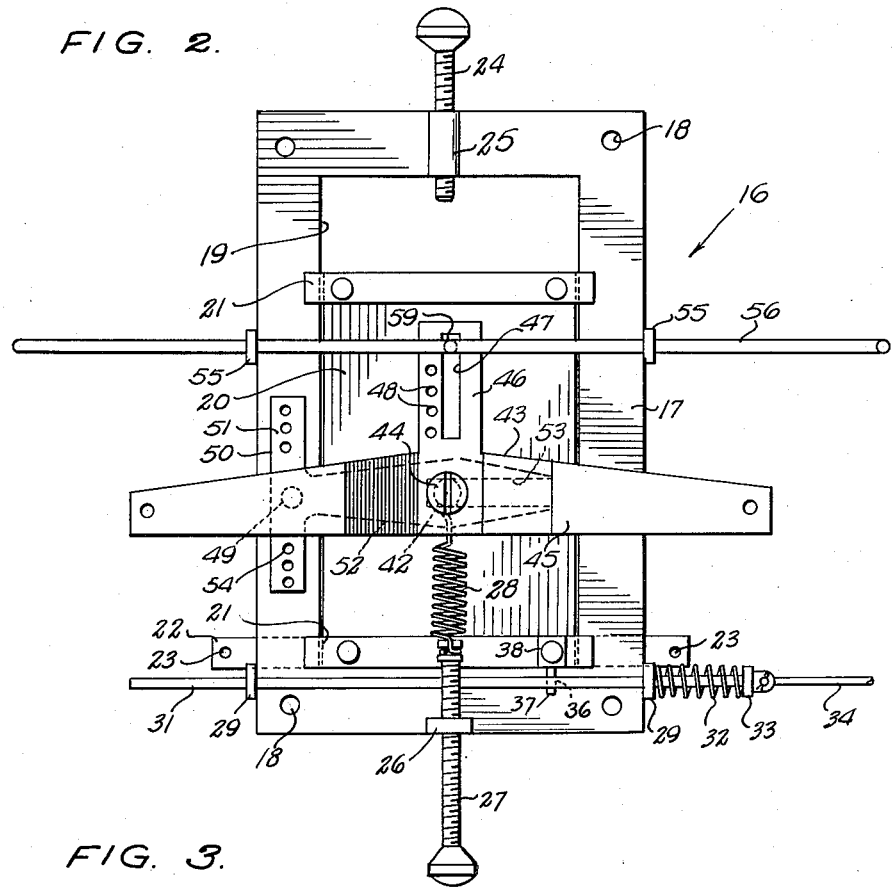
Figure 2 is an enlarged top plan view of the control unit.
Figure 3:
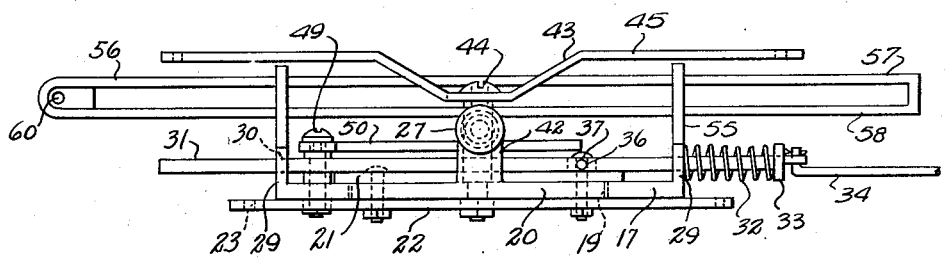
Figure 3 is an outboard end elevation thereof.

A pivot 49 on the rear side of the base plate 17 in line with the spacer 42 in the retracted position of the operating slide 20, as shown in Figure 2, mounts a T-shaped rudder bell crank 50, the pivot 49 passing through the middle of the cross-head 51. A right-angular arm 52 extends forwardly from the cross-head 51 and has a longitudinal slot 53 slidably engaging the spacer 42, so that whenever the operating slide 20 is moved, the rudder bell crank 50 is swung on its pivot 49. On each side of the pivot 49 the cross-head 51 has a series of holes 54. The middle portion of the master bell crank 43 is depressed, as shown in Figure 3.

Lugs 55 rise from the front and rear edges of the base plate 17 in line with the inboard end of the arm 46 of the master bell crank 43 and slidably support an elongated elevator actuator bar 56. The bar 56 includes upper and lower rods 57 and 58, respectively, between whose middle points a pin 59 is carried which slidably engages the slot 47 of the arm 46 of the master bell crank 43, with the arm 46 between the rods. The rearward end of the rudder actuator bar 56 is provided with a hole 60.

As shown in Figure 1, the operator's control wires 39 and 40 are connected to the opposite ends of the cross-head 45 of the master bell crank 43 and pass through guides 61 and 62, respectively, on the left or inboard wing tip.

Each of the wing flaps 14 is operated by a connection 63 between its horn 14' and one arm of a bell crank 64 mounted on the related wing, having the other arm thereof connected by a wire 65 with the rearward hole 23 in the outboard slide guide 22.

Each of the ailerons 15 is connected by a connection 66 with one arm of a bell crank 67 mounted forwardly on the related wing, the other arm of the bell crank 67 being connected by a wire 68 with the forward end of the lower slide guide 22. The bell cranks 67 are reversed with respect to each other so that in the true pre-flight disposition of the airplane, shown in Figure 1, the right wing aileron 15 is angled in "up" position and the left wing aileron 14 is angled in "down" position, as shown in full lines. The initial amount of such angulations is determined by adjustment of the screw 27.

The horn 11' of the elevator is connected by a wire 69 to the rearward end of the elevator actuator bar 56, being engaged with hole 60 therein.

The rudder bar 70 has opposite ends thereof connected by crossed wires 71 with opposite sides of the cross-head 51 of the rudder bell crank 50, the connections being made in selected ones of the holes 54.

The reason the control horns 14' and 15' of the flaps and ailerons are on the under sides thereof is that when the centrifugal pull is greater than the slide-retarding spring 28, the slide 20 is pulled toward the left or inboard side of the airplane. With this motion wire 68 connected to bell crank 67 relays the pull to the aileron 15 through wire 66. To cause the aileron 15 on the right wing to move from full up to an intermediate position, the pull must be applied to the under side of the aileron. Therefore, the control horns 14' and 15' must be on the under sides of the control surfaces.

As viewed in Figure 1, the positions of the control surfaces preceding flight are:
 Aileron on right wing 13 at up position;
 Aileron on left wing 12 at down position;
 Rudder 9 at full right position;
 Flaps 14 at down position;
 Elevators 10 and 11 at positions desired by operator.

When the airplane 5 takes off, the ailerons 15, which are coordinated with the rudder 9, cause the airplane to make a right turn and bank so as to keep the control wires 39 and 40 taut, the amounts of turn and bank being limited by the pull on the control wires. As the airplane gains speed and its centrifugal pull on the control wires increases, the operating slide 20 is pulled away from its retracted position. As a result, the ailerons 15 are moved past an intermediate position or to a position determined by the operator. At the same time, the flaps 14 are moved toward up position. When the motor runs out of gas, the speed of the plane diminishes and the centrifugal pull on the control wires 39 and 40 being lessened, the spring 28 returns the operating slide 20 to retracted position, thereby throwing the flaps 14 down to landing position.

During the actions described above, the rudder 9 is turned away from full rudder position toward an intermediate position or one determined by the operator, since, as the speed of the airplane 5 increases, less rudder is needed. As the speed of the airplane decreases and the pull on the wires 39 and 40 lessens, the retracting movement of the operating slide 20 restores the rudder 9 toward full rudder position.

The left elevator 10 moves up when the front control wire 39 is pulled and down when the rear control wire 40 is pulled or tightened. More elevator is required at slow speed than at high speed, and this is provided for by the leverage-reducing pin-and-slot connection of the master bell crank 43 with the elevator actuator bar 56, whereby over-controlling of the elevator 10 is precluded.

A taut condition of the control wires 39 and 40 is necessary to full control at all times of the airplane 5. Whenever the airplane is caused, as by a strong wind, to deviate from its established path and move toward the operator and produce slack in the control wires, the spring 28 is freed to return the operating slide 20 to retracted, initial position, thereby returning the ailerons, flaps, rudder and elevator to their initial positions, and thereby causing the airplane 5 to return to its established flight path or course, wherein the control wires 39 and 40 become taut.

To cause the airplane 5 to ascend, the front wire 39 is pulled by the operator. With the airplane in flight, the rear wire 40 is pulled to cause the airplane to descend.

The holes 48 are provided in the arm 46 of the master bell crank 43 to enable connection of elevator linkage so as to eliminate variable changes in leverage to the elevators when constant full travel of the elevator is needed for stunting the airplane. Such connection does not change the action of the control unit 16 in controlling the rudder, ailerons, flaps, landing gear or any other control element that is actuated by the operating slide 20.

The above-described device aids in preventing the airplane from slipping toward the operator when at the maximum altitude of the control lines. Further, captive airplanes made longer and heavier than now practical may be hand flown when equipped with this device.

It will therefore be understood that to begin the counterclockwise flight of the airplane, the control surfaces are pre-set so as to cause the airplane 5 to have a tendency to execute a right turn and bank. The pre-set position of the controls should be so as to have the aileron on the right or outboard wing to be at up position. The aileron on the left or inboard wing should be at down position. This causes the airplane to have a tendency to execute a right bank away from the operator, thus keeping the control wires taut.

The rudder 9 is pre-set to full right position, and since the ailerons and rudder are coordinated, the airplane tends to execute a right turn and bank away from the operator. This right turn and bank is limited by the pull on the control wires. As the airplane overcomes static inertia and gains flying speed, the centrifugal pull increases and at maximum speed the pull is intensified and may build up to a point greater than the operator can safely hold. The centrifugal pull is relieved at the point that the centrifugal pull becomes greater than the tension of the slide-retarding spring 28. At that point the slide is pulled toward the inboard or left side of the plane and by linkage to the ailerons and rudder they are caused to move to an intermediate or neutral position.

Should the centrifugal pull at that time be greater than the operator can safely hold, then on the next flight the ailerons and rudder can be pre-set to move past the intermediate or neutral position, thus further relieving the centrifugal pull. This adjustment must be made to fit the flight characteristics and weight of the airplane. As the engine stops and the airplane slows up to landing speed, then more control is needed to keep the wires taut at slow speed.

This is achieved when the centrifugal pull becomes less than that of the slide-tensioning spring 28. At such point the spring 28 pulls the slide toward the right or outboard side of the plane and moves the aileron 15 on the right wing to up position, the aileron on the left or outboard wing to down position, and moves rudder 9 back to full right position. This tends to hold the plane against the control wires, thereby keeping them taut.

What is claimed is:

1. In a captive airplane having wing flaps, ailerons, a rudder, an elevator, and a pair of operator's control wires extending away from the inboard side of the airplane, a control unit comprising a base mounted stationarily on the airplane, an operating slide mounted on said base for movement crosswise of the airplane in inboard and outboard directions, retracting spring means for returning said operating slide in an outboard direction opposite to the pull of the operator's control wires, a master bell crank pivoted intermediate its ends on said operating slide having said operator's control wires severally connected to opposite ends thereof whereby a greater pull on one of said control wires pivots said master bell crank out of an intermediate position and into a flight-correcting position, a rudder bell crank pivoted on said base plate at one side of said master bell crank and having a pin-and-slot connection with said master bell crank and operating slide, an elevator actuator bar mounted on said base plate to slide endwise across said operating slide and having a pin-and-slot connection with said master bell crank, first means connecting said rudder bell crank with said rudder, second means connecting said slide with said flaps, third means connecting said elevator actuator bar with said elevator, and fourth means connecting said operating slide with said ailerons, said rudder, said flaps, and said ailerons being initially set for a predetermined centrifugal flight path for the airplane relative to a position of the operator with said operating slide in retracted position, whereby when the centrifugal pull upon said operator's control wires becomes greater or less as said airplane moves in said predetermined flight path and its speed of flight therein increases or decreases, said operating slide will be progressively pulled away from its retracted position against the resistance of said spring means or permitted to be retracted by said spring means so as to coordinately produce corresponding corrective positionings of said rudder, said elevator, and said ailerons for the increase or decrease in speed, and whereby whenever said airplane is forced out of the predetermined flight path toward the operator's position and said control wires tend to become slack, said spring means will act to retract said operating slide to its retracted position and thereby restore the initial setting of said rudder, said flaps and said ailerons so as to maintain the airplane in its predetermined flight path and maintain the control wires taut.

2. In a captive airplane having wing flaps, ailerons, a rudder, an elevator, and a pair of operator's control wires extending away from the inboard side of the airplane, a control unit comprising a base mounted stationarily on the airplane, an operating slide mounted on said base for movement crosswise of the airplane in inboard and outboard directions, retracting spring means for returning said operating slide in an outboard direction opposite to the pull of the operator's control wires, a master bell crank pivoted intermediate its ends on said operating slide having said operator's control wires severally connected to opposite ends thereof whereby a greater pull on one of said control wires pivots said master bell crank out of an intermediate position and into a flight-correcting position, a rudder bell crank pivoted on said base plate at one side of said master bell crank and having a pin-and-slot connection with said master bell crank and operating slide, an elevator actuator bar mounted on said base plate to slide endwise across said operating slide and having a pin-and-slot connection with said master bell crank, first means connecting said rudder bell crank with said rudder, second means connecting said slide with said flaps, third means connecting said elevator actuator bar with said elevator, and fourth means connecting said operating slide with said ailerons, said rudder, said flaps, and said ailerons being initially set for a predetermined centrifugal flight path for the airplane relative to a position of the operator with said operating slide in retracted position, whereby when the centrifugal pull on said operator's control wires becomes greater or less as said airplane moves in said predetermined flight path and its speed of flight therein increases or decreases, the operating slide will be progressively pulled away from its retracted position against the resistance of said spring means or permitted to be retracted by said spring means so as to coordinately produce corresponding corrective positionings of said rudder, said elevator, and said ailerons for the increase or decrease in speed, and whereby whenever said airplane is forced out of the predetermined flight path toward the operator's position and said control wires tend to become slack, said spring means will act to retract said operating slide to its retracted position and thereby restore the initial setting of said rudder, said flaps, and said ailerons so as to maintain the airplane in its predetermined flight path and maintain the control wires taut, said airplane having an engine timer arm, an engine timer control slide bar mounted on said base plate for endwise movement adjacent said operating slide, spring means projecting said slide bar in a direction to produce advance of said timer arm, means connecting said slide bar with said timer arm whereby in the projected position of said slide bar said timer arm is in advanced position for flight speed operating of the associated engine, and means acting between said operating slide and said slide bar only in the retracted positions of said operating slide and slide bar whereby said slide bar and the connected timer arm are retained in engine-retarding position only while said operating slide is in retracted position and whereby said slide bar is moved by its spring means to projected position to advance said timer arm whenever said operating slide is pulled away from its retracted position.

WILLIAM H. BURKS, Jr.

REFERENCES CITED

The following references are of record in the file of this patent:

UNITED STATES PATENTS

| Number | Name | Date |
| --- | --- | --- |
| 2,061,953 | Sampson | Nov. 24, 1936 |
| 2,292,416 | Walker | Aug. 11, 1942 |
| 2,303,965 | Walker | Dec. 1, 1942 |
| 2,404,922 | Padgett | July 30, 1946 |
| 2,490,313 | Meister | Dec. 6, 1949 |